United States Patent
Lucking et al.

(10) Patent No.: US 9,135,822 B2
(45) Date of Patent: Sep. 15, 2015

(54) MONITORING SYSTEM FOR MONITORING THE SURROUNDING AREA, IN PARTICULAR THE AREA BEHIND MOTOR VEHICLES

(75) Inventors: Christoph Lucking, Hannover (DE);
Rainer Risse, Pattensen-Reden (DE);
Udo Ronnenberg, Wedemark (DE);
Axel Stender, Hameln (DE)

(73) Assignee: WABCO GmbH, Hannover (DE)

( * ) Notice: Subject to any disclaimer, the term of this patent is extended or adjusted under 35 U.S.C. 154(b) by 186 days.

(21) Appl. No.: 13/810,794

(22) PCT Filed: Jul. 16, 2011

(86) PCT No.: PCT/EP2011/003556
§ 371 (c)(1),
(2), (4) Date: Jan. 17, 2013

(87) PCT Pub. No.: WO2012/013305
PCT Pub. Date: Feb. 2, 2012

(65) Prior Publication Data
US 2013/0116905 A1     May 9, 2013

(30) Foreign Application Priority Data
Jul. 30, 2010   (DE) .................. 10 2010 032 909

(51) Int. Cl.
*G08G 1/16* (2006.01)
*B60Q 9/00* (2006.01)
(Continued)

(52) U.S. Cl.
CPC ...... *G08G 1/16* (2013.01); *B60Q 9/006* (2013.01); *G01S 15/87* (2013.01); *G01S 15/931* (2013.01); *B60W 30/18036* (2013.01); *G01S 2015/933* (2013.01); *G01S 2015/939* (2013.01)

(58) Field of Classification Search
CPC ....... G01S 15/88; G01S 15/93; G01S 15/931; G01S 2015/93; G01S 2015/931; G01S 2015/939; G01S 2015/937; G01S 15/87; G08G 1/16; B60Q 9/006
USPC .......................... 701/300, 301; 340/435, 436
See application file for complete search history.

(56) References Cited

U.S. PATENT DOCUMENTS 5,279,672 A * 1/1994 Betker et al. ................... 134/18
5,332,057 A * 7/1994 Butsuen et al. ............... 180/169
(Continued)

FOREIGN PATENT DOCUMENTS

DE   198 45 568   10/1999
DE   199 28 679   12/2000
(Continued)

OTHER PUBLICATIONS
Groeneveld-Group; Automotive Maintenance; Greensight; www.groeneveld-group.com/index.php?id=76&productid=139.

Primary Examiner — John Q Nguyen
Assistant Examiner — Michael Whalen
(74) Attorney, Agent, or Firm — Kramer Levin Naftalis & Frankel LLP

(57) ABSTRACT

A system for monitoring the area surrounding a vehicle, especially behind the vehicle and/or a connected trailer. The system includes distance sensors, which are arranged in a main plane and in at least one additional plane, for detecting objects in the respective monitoring region that pose a risk of collision and/or that limit passage height and/or width. The system also includes a device that evaluates the distance sensor signals to ascertain the current distance of the vehicle from the detected object and to compare the current distance against a predefinable, vehicle-specific setpoint distance value and to output a warning signal if a predefinable difference value therebetween is not reached. To cover the monitoring region both in area and height, additional distance sensors are arranged in at least one additional plane such that objects that cannot be identified by the sensors in the main plane can be detected over the entire width of the vehicle.

10 Claims, 1 Drawing Sheet

(51) Int. Cl.
    *G01S 15/87*     (2006.01)
    *G01S 15/93*     (2006.01)
    *B60W 30/18*     (2012.01)

(56) References Cited

U.S. PATENT DOCUMENTS

| | | |
|---|---|---|
| 5,528,217 A | 6/1996 | Adams |
| 5,574,426 A | 11/1996 | Shisgal et al. |
| 5,869,764 A | 2/1999 | Schulte |
| 6,737,963 B2 * | 5/2004 | Gutta et al. ............ 340/435 |
| 7,259,660 B2 | 8/2007 | Ewerhart et al. |
| 7,640,108 B2 * | 12/2009 | Shimizu et al. .......... 701/301 |
| 8,005,616 B2 * | 8/2011 | Beuschel et al. ......... 701/301 |
| 8,013,722 B2 | 9/2011 | Breuer et al. |
| 8,731,777 B2 * | 5/2014 | Castaneda et al. ......... 701/41 |
| 2006/0119473 A1 | 6/2006 | Gunderson et al. |
| 2009/0070039 A1 * | 3/2009 | Beuschel et al. ......... 701/301 |
| 2009/0143987 A1 * | 6/2009 | Bect et al. ............... 701/301 |

FOREIGN PATENT DOCUMENTS

| | | |
|---|---|---|
| DE | 101 47 443 | 4/2003 |
| DE | 10 2004 015 749 | 12/2004 |
| DE | 10 2005 019 550 | 11/2006 |
| DE | 10 2005 034 277 | 2/2007 |
| DE | 10 2007 053 989 | 5/2009 |
| DE | 10 2009 040 170 | 4/2010 |
| EP | 1 909 114 | 4/2008 |
| WO | WO 2006114206 | 11/2006 |

* cited by examiner

MONITORING SYSTEM FOR MONITORING THE SURROUNDING AREA, IN PARTICULAR THE AREA BEHIND MOTOR VEHICLES

FIELD OF THE INVENTION

The invention generally relates to a monitoring system for monitoring the area surrounding a vehicle.

BACKGROUND OF THE INVENTION

Monitoring the area behind motor vehicles is a highly topical subject. Reversing can present significant hazards, since the driver cannot see the whole of the hazardous area behind. There is therefore a risk of colliding with buildings, goods, persons or other objects. This is especially a problem when reversing commercial vehicles or construction machinery. For this reason, a range of methods for monitoring the area behind the vehicle have already been proposed. Conventional rear area monitoring systems mostly use distance sensors that are installed at one location or in one plane at the rear of the vehicle, and that indicate the distance from an obstacle. Use is made of the ultrasonic echo method, employing ultrasonic sensors, which in themselves are known, but which nevertheless only have a limited detection range, so that, generally, it is not possible to detect all the objects behind a vehicle.

Storing limit values in a vehicle, in particular for the width and height of the vehicle, is also known—see, e.g., DE 199 28 679 A1. The position of the vehicle is detected; as the vehicle approaches relevant structures, the vehicle data is compared against the data saved about the relevant structure. If the vehicle cannot pass the structure because it is too high or too wide, a warning is issued to the driver.

DE 10 2004 015 749 A1 discloses equipment for determining the possibility of a vehicle passing. The equipment estimates whether the height of the vehicle and/or the width of the vehicle permits it to pass between obstacles.

DE 10 2007 053 989 A1 discloses an arrangement for warning about obstacles affording insufficient height to pass and/or insufficient width to pass. Overhead obstacles and/or lateral obstacles in front of the vehicle are scanned in order to capture passage-related data from the obstacles, whereby the surface of the road is also scanned at the same time. The ascertained passage-related data from the obstacles is compared against passage-related data from the vehicle. A warning signal is issued to the driver if the passage-related data from the vehicle is greater than or equal to the passage-related data from the obstacles. The warning signals may be of a visual, audible or haptic nature.

Groeneveld sells an object detection system under the name GREENSIGHT. This includes an active camera detection system that provides the driver with a complete image of the situation behind the vehicle. In addition to the camera detection system, the Groeneveld object detection system employs a sensor system that uses ultrasound to scan the area behind the vehicle. The detection area is distributed over three zones. The closer the object, the more insistent visual and audible warning signals become. The object detection system can be used with two additional ultrasonic units at the top corners of the vehicle in order to detect objects such as hanging signs, half-open roller doors and tree branches. In this known system, however, only the outer edges of the vehicle are monitored.

The known rear area monitoring systems offer good coverage of the surface of the monitoring region. The monitoring region is not sufficiently covered at height, however.

SUMMARY OF THE INVENTION

It is an object of the present invention to provide a monitoring system in which the monitoring area or the detection region is well covered, over the entire vehicle width of the monitoring system, not only at the surface but also at height, at relatively little additional expense.

According to an embodiment of the present invention, in addition to a main monitoring plane of the monitoring system, at least one additional monitoring plane is provided, as a result of which the monitoring region or the detection region of the monitoring system is significantly extended, so that objects, obstacles and so forth that are not detected by the sensors in the main monitoring plane alone can be detected.

Distance sensors are employed on the vehicle, in particular in the rear area of the vehicle, which, in accordance with one embodiment, are known ultrasonic sensors.

It will be appreciated that with the aid of the inventive monitoring system it is possible to determine possibilities of a vehicle passing obstacles, since before an obstacle is reached the passage width and/or the passage height at the obstacle is measured by the sensors and can be compared against passage-related vehicle data. It is also possible in this way to react to current changes in the profile of the road. This permits the vehicle driver to avoid the situation in which the driver initially drives in between narrow obstacles but must then reverse since the vehicle cannot in fact pass the obstacles.

The inventive monitoring system can be employed generally to monitor the area surrounding vehicles, such that sensors can also be attached to the front of the vehicle, so that, for instance, an estimation of the passage width and/or passage height can be carried out both for forward travel as well as when the vehicle is in reverse.

According to a further embodiment of the present invention, the distance sensors can be activated depending on the speed of the vehicle. The greater the speed of the vehicle, the faster, or the earlier, the distance sensors are activated, so that a timely warning of a possible collision is always ensured, and an unnecessary activation of the monitoring system can be avoided.

In a further embodiment, the monitoring system is first activated during reverse travel of the vehicle above a predefinable speed. This means that no irritating warnings are triggered when maneuvering in narrow areas.

According to another embodiment, automatic braking capability is provided when a risk of collision is detected, whereby the braking is carried out depending on the speed of the vehicle. These measures achieve greater monitoring certainty behind the vehicle. It is, moreover, possible to set different halting distances for the monitoring planes, so that, for instance, a greater halting distance is set when reversing with a lowered loading ramp than for the roof area.

In order to also be able to detect objects that could collide with the upper area and with the lower area of the vehicle, tree branches or low barriers for instance, additional sensors are arranged in the upper and lower areas of the vehicle according to another embodiment of the present invention.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

The invention is explained in more detail below with reference to exemplary embodiments depicted in the appended drawings, in which.

DETAILED DESCRIPTION OF THE PREFERRED EMBODIMENTS

Figure 1:
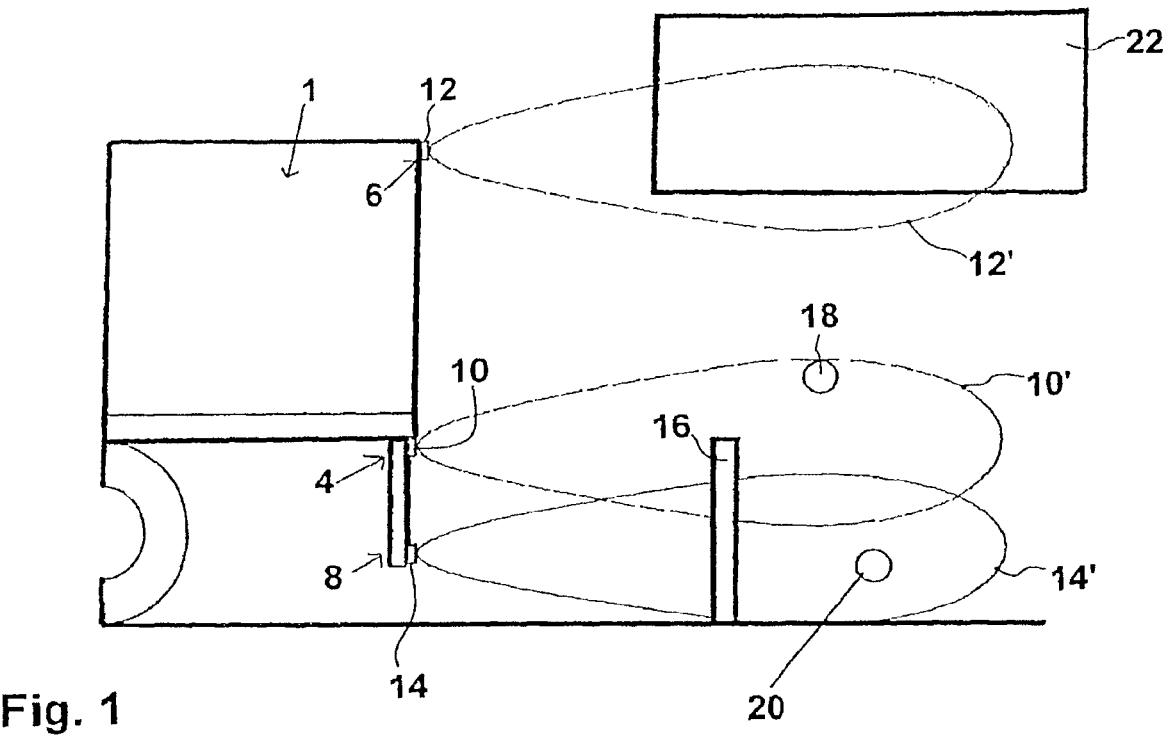
FIG. 1 is a schematic view of the rear part of a truck with distance sensors arranged in three monitoring planes in accordance with an embodiment of the present invention.
Figure 2:
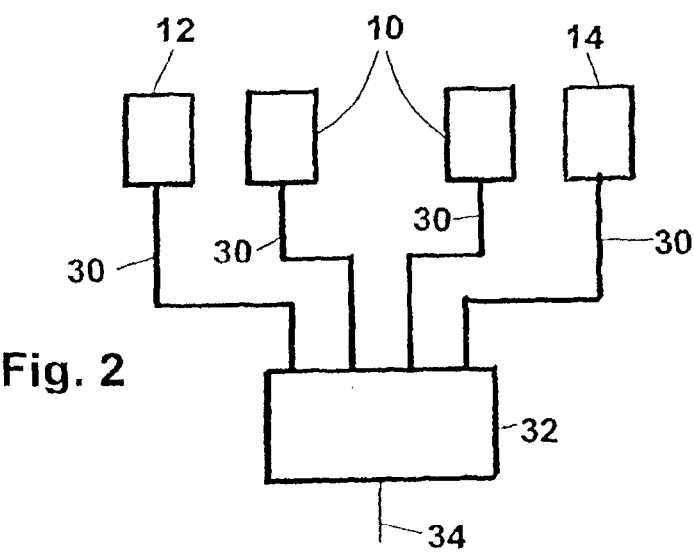
FIG. 2 is a block diagram of a monitoring system according to an embodiment of the present invention.

The drawing figures provide a schematic illustration of the rear part of a goods vehicle 1 with the position of three planes, a central, main monitoring plane 4, an additional upper monitoring plane 6, and an additional lower monitoring plane 8. Distance sensors 10, 12, 14 are arranged in the three planes in order to detect objects or obstacles in the respective monitoring region 10', 12', 14' that present a risk of collision, and/or that limit the passage height and/or the passage width. The drawings show just one distance sensor in each plane. It should be understood, however, that a plurality of distance sensors can be arranged in each plane.

With the distance sensors 10 in the main plane 4, normal objects such as pillars 16 and high barriers 18 can be detected, while low barriers 20 can be detected with the lower additional plane 8 and objects located at height, such as overhanging loading ramps 22 as are shown schematically, or branches, can be detected with the upper additional plane 6.

The ultrasonic sensors 10, 12, 14 are connected via cable connections 30 to an evaluation unit 32. The results of the evaluation are supplied via an interface 34 to a vehicle computer, or directly to vehicle electronics.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall there-between.

What is claimed is:

1. A monitoring system for monitoring the area surrounding a vehicle, the system comprising distance sensors arranged at a rear of the vehicle in a main plane and in at least one additional plane, the sensors being configured to detect objects in respective monitoring regions that at least one of present a risk of collision and limit at least one of passage height and passage width, ones of the sensors arranged in the at least one additional plane being arranged such that objects that are not detectable by any distance sensor in the main plane are detectable across an entire width of the vehicle; and a device configured to evaluate signals received from the distance sensors to determine a current distance of the vehicle from a detected one of the objects, to determine a difference between the current distance and a predefinable vehicle-specific setpoint distance, and to output a warning signal when the current distance falls below the difference between the current and setpoint distances.

2. The monitoring system as claimed in claim 1, wherein the distance sensors include ultrasonic sensors.

3. The monitoring system as claimed in claim 1, wherein the distance sensors are actuatable to detect the objects based on vehicle speed.

4. The monitoring system as claimed in claim 1, wherein the monitoring system is first actuatable to monitor the area surrounding the vehicle during reverse travel of the vehicle above a predefinable speed.

5. The monitoring system as claimed in claim 1, wherein the distance sensors are separately settable for each of the main plane and the at least one additional plane.

6. The monitoring system as claimed in claim 1, wherein the vehicle includes an automatic braking function configured to automatically brake the vehicle when a risk of collision is detected.

7. The monitoring system as claimed in claim 6, wherein the automatic braking function is configured to automatically brake the vehicle based on the speed of the vehicle.

8. The monitoring system as claimed in claim 1, wherein the at least one additional plane includes at least one of an upper and lower area of the vehicle.

9. The monitoring system as claimed in claim 6, wherein different halting distances are settable for each of the main plane and the at least one additional plane.

10. The monitoring system as claimed in claim 6, wherein the automatic braking function is configured to brake the vehicle based on distance of the vehicle from a detected object.

* * * * *